(12) United States Patent
Bonk et al.

(10) Patent No.: US 6,696,193 B2
(45) Date of Patent: Feb. 24, 2004

(54) MANIFOLD ATTACHMENT SYSTEM FOR A FUEL CELL STACK

(75) Inventors: Stanley P. Bonk, Tolland, CT (US); Xiaoguang Yu, Enfield, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 250 days.

(21) Appl. No.: 09/920,914

(22) Filed: Aug. 2, 2001

(65) Prior Publication Data

US 2003/0027029 A1 Feb. 6, 2003

(51) Int. Cl.⁷ .................... H01M 2/08; H01M 2/00; H01M 2/02
(52) U.S. Cl. .................... 429/34; 429/35; 429/37; 429/38
(58) Field of Search .................... 429/37, 34, 35, 429/38

(56) References Cited

U.S. PATENT DOCUMENTS

| 4,345,009 A | 8/1982 | Fahle et al. |
| 4,849,308 A | 7/1989 | Schmitten et al. |
| 5,686,200 A | 11/1997 | Barton et al. |
| 6,461,756 B1 * | 10/2002 | Blanchet et al. .............. 429/37 |

FOREIGN PATENT DOCUMENTS

| WO | WO 0239532 | 5/2002 |

OTHER PUBLICATIONS

Fuel Cell Handbook, USDOE, Oct. 2000, available online at http://www.fuelcells.org/fchandbook.pdf, pp. 3–2 and 3–3.*

* cited by examiner

Primary Examiner—Patrick Ryan
Assistant Examiner—Julian Mercado
(74) Attorney, Agent, or Firm—Bachman & LaPointe

(57) ABSTRACT

A fuel cell stack assembly includes a fuel cell component and at least one manifold positioned adjacent to the fuel cell component; and a cable disposed around the fuel cell stack assembly for securing the manifold to the fuel cell component, the cable having an adjustable securing member for adjusting tightness of the cable around the fuel cell assembly.

13 Claims, 3 Drawing Sheets

MANIFOLD ATTACHMENT SYSTEM FOR A FUEL CELL STACK

BACKGROUND OF THE INVENTION

The invention relates to a fuel cell stack assembly and, more particularly, to a manifold attachment system for a fuel cell stack which reduces the volume of the overall cell stack assembly.

Fuel cells and fuel cell stack assemblies (CSAs) are used as power sources for various purposes including commercial power sources, transportation use and the like.

In a typical fuel cell stack assembly, for example as shown in FIG. 1, the fuel cell stack structure 1 is provided and manifolds such as air manifolds 2 and fuel manifolds 3 are held to the stack 1 using frames 4 which are typically held together using tie rods (not shown) to compress the manifold seals within the stack.

Unfortunately, when both air and fuel manifolds are external to the stack as shown in FIG. 1, these systems are very inefficient in use of space, and this makes use of such a fuel cell in transportation and other applications difficult.

It is clear that the need remains for fuel cell stack assemblies which occupy less space.

It is therefore the primary object of the present invention to provide a fuel cell stack arrangement and manifold attachment system which occupies less space.

It is a further object of the present invention to provide such a system wherein the attachment structure is easily assembled, and reliable in use.

Other objects and advantages of the present invention will appear hereinbelow.

SUMMARY OF THE INVENTION

In accordance with the invention, the foregoing objects and advantages have been readily attained.

According to the invention, a fuel cell stack assembly is provided, which comprises a fuel cell component and at least one manifold positioned adjacent to said fuel cell component; and a cable disposed around said fuel cell stack assembly for securing said manifold to said fuel cell component, said cable having an adjustable securing member for adjusting tightness of said cable around said fuel cell assembly.

In accordance with the invention, the cable can advantageously be provided having a minimum breaking strength of about 450 lbs., approximately twice the required load, which advantageously allows for some give in the band when subjected to excessive force so as to allow gas to escape while preserving the mechanical integrity of the fuel cell stack as desired.

Still further, outwardly facing corners of the fuel cell assembly are shaped, in accordance with the invention, so as to have angled surfaces, preferably defined in slots, to help in properly locating the cable and further to reduce focused stresses on the cable.

BRIEF DESCRIPTION OF THE DRAWINGS

A detailed description of preferred embodiments of the present invention follows, with reference to the attached drawings, wherein.

DETAILED DESCRIPTION

Figure 2:
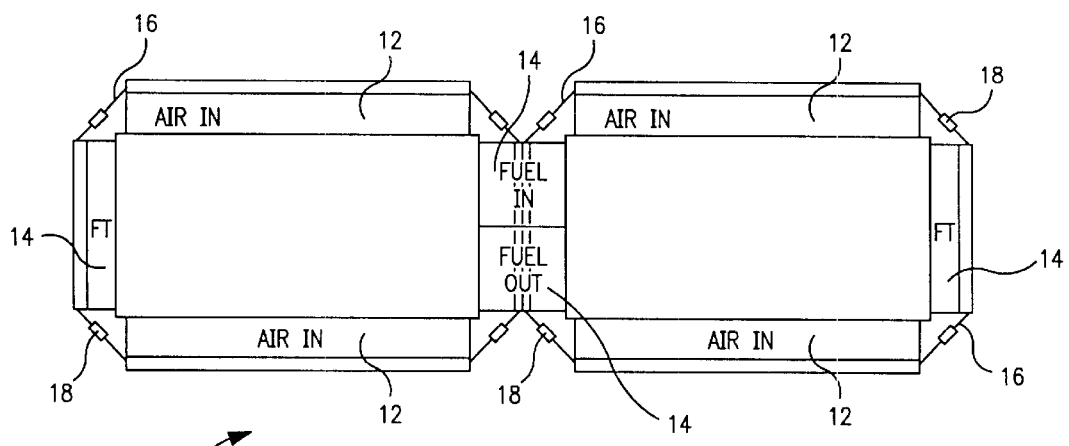
FIG. 2 schematically illustrates a fuel cell stack assembly with manifold attachment system in accordance with the present invention.

Turning to the drawings, FIG. 2 schematically shows a fuel cell stack assembly 10 in a dual stack arrangement wherein external air manifolds 12 and external fuel manifolds 14 are secured to the stack using one or more bands 16 secured around the stack and manifolds so as to securely hold these components together and compress manifold seals between manifolds 12, 14 and the fuel stack assembly as desired. As shown, bands 16 are preferably secured using an adjustable securing member 18, which advantageously allows for simple and reliable tightening and loosening of band 16, preferably utilizing a minimal amount of tools.

Figure 3:
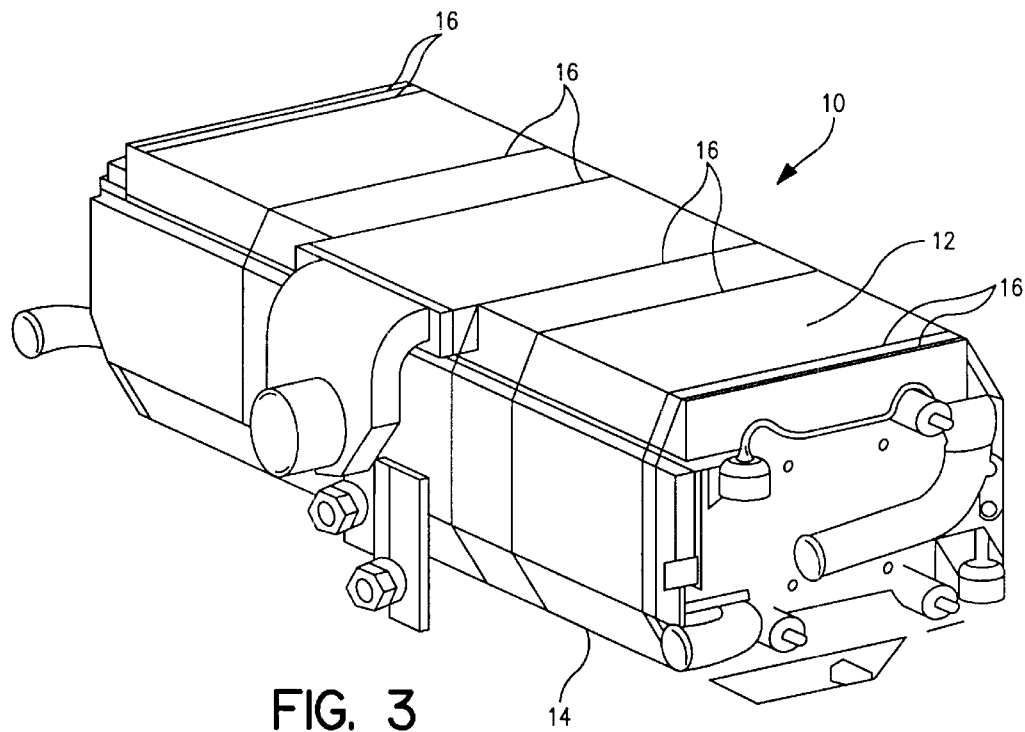
FIG. 3 is a perspective view of a fuel cell stack assembly with external manifolds secured using the band structure in accordance with the present invention.

FIG. 3 shows a further illustration of a fuel cell stack assembly 10, in this case a single stack arrangement, using bands 16 to hold manifolds 12, 14 in place as desired. As shown, a plurality of bands 16 are advantageously positioned along the length of fuel cell stack 10, and bands 16 advantageously serve to securely hold manifolds 12, 14 in place as desired.

Figure 1:
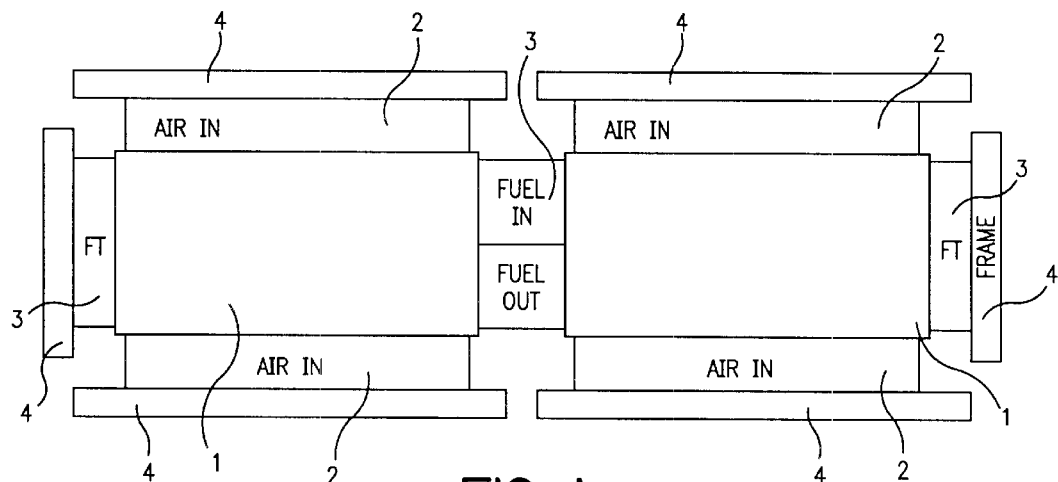
FIG. 1 is a schematic illustration of a prior art fuel cell stack assembly with manifold attachment system.

Bands 16 in accordance with the present invention are particularly advantageous in that they occupy substantially less space or volume than the frame structure which is utilized in the prior art (see FIG. 1). For a typical assembly, it has been found that the band structure of the present invention can provide for at least a 90% reduction in volume over frame and tie rod structures, and further provides for a substantial reduction in weight, which is also particularly advantageous in the transportation field.

Figure 4:
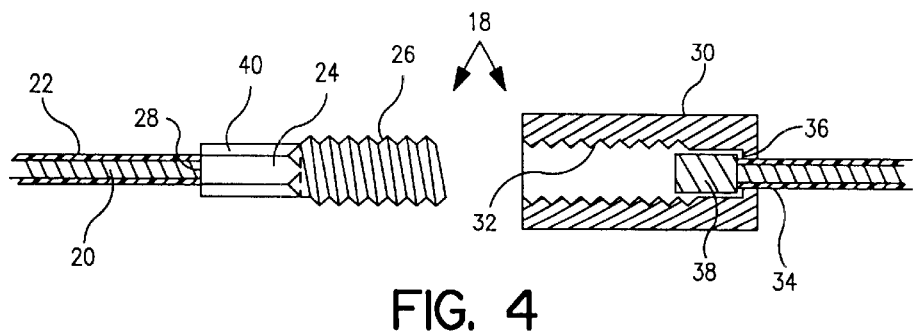
FIG. 4 schematically illustrates a preferred fastener for use in securing bands around the fuel cell assembly.

In further accordance with the present invention, cable 16 is preferably provided of a material or combination of materials selected to have minimum breaking strength of about 450 lbs. More preferably, and as shown in FIG. 4, cable 16 may be provided as a stranded cable 20 which is preferably coated with a plastic or other elastomer jacket 22, as shown, and such a structure having the desired modulus of elasticity further serves to act as a safety relief mechanism, allowing the manifold seals to leak before structural damage to the fuel cell stack can occur. Further, the modulus of elasticity of cables 16 in accordance with the present invention advantageously serves to re-seat the manifolds and seals between manifolds and the remainder of the stack so that the fuel cell stack will re-seat after a pressure pulse has passed.

One particularly preferred cable is a low-stretch, high-fatigue cable, for example a stainless steel cable, having minimal stretch when subjected to repeated tension cycles, for example showing a stretch of less than about 0.005 inches per foot after 1.6 million cycles.

Still referring to FIG. 4, a preferred embodiment of an adjustable securing member 18 in accordance with the present invention is shown.

As shown, adjustable securing member 18 may advantageously be provided in the form of a first threaded member 24, preferably having external threads 26 and being substantially fixedly mounted to one end 28 of cable 16, and further including a threaded sleeve 30, preferably having an internal thread 32 selected to engage with external threads 26, and rotatably yet linearly fixedly mounted to the other end 34 of cable 16. This structure advantageously allows for threads 32 to be engaged with threads 26 and tightened or loosened so as to adjust the tension of cable 16 about the components of a fuel cell stack assembly. Further, the threads of such a securing member are engaged in a 360° radius and are therefore particularly desirable for reliable connection.

Still referring to FIG. 4, sleeve 30 may advantageously be rotatably positioned on cable 16 as desired by providing sleeve 30 with an inwardly extending flange 36 at one end, and providing end 34 of cable 16 with an enlarged portion 38 which is sized to engage with flange 36 and prevent removal of sleeve 30 from end 34 while nevertheless allowing rotation in place as desired.

Further as shown in FIG. 4, sleeve 30 may advantageously have a hex-outer shape, or other selected shape which is readily adaptable to tightening and loosening using commonly available hand tools. Threaded member 34 may also advantageously be provided with such a structure, for example as illustrated at 40.

It should also be appreciated that although FIG. 4 illustrates a preferred embodiment of an adjustable securing member, other structures would also be acceptable, such as turnbuckles, threaded-machined blocks, suit-case-style latches, ski-boot-type toggles and straps with manifold loading fixtures.

Returning to FIG. 2, it may be desirable to provide cable 16 as a plurality of cable portions each having two ends and being connected to an adjacent cable portion so as to define the entire cable 16 surrounding a complete fuel stack assembly with manifolds. For example, in FIG. 2, each stack assembly is secured with a plurality of bands 16, and each band 16 includes four band segments or portions.

Figure 5:
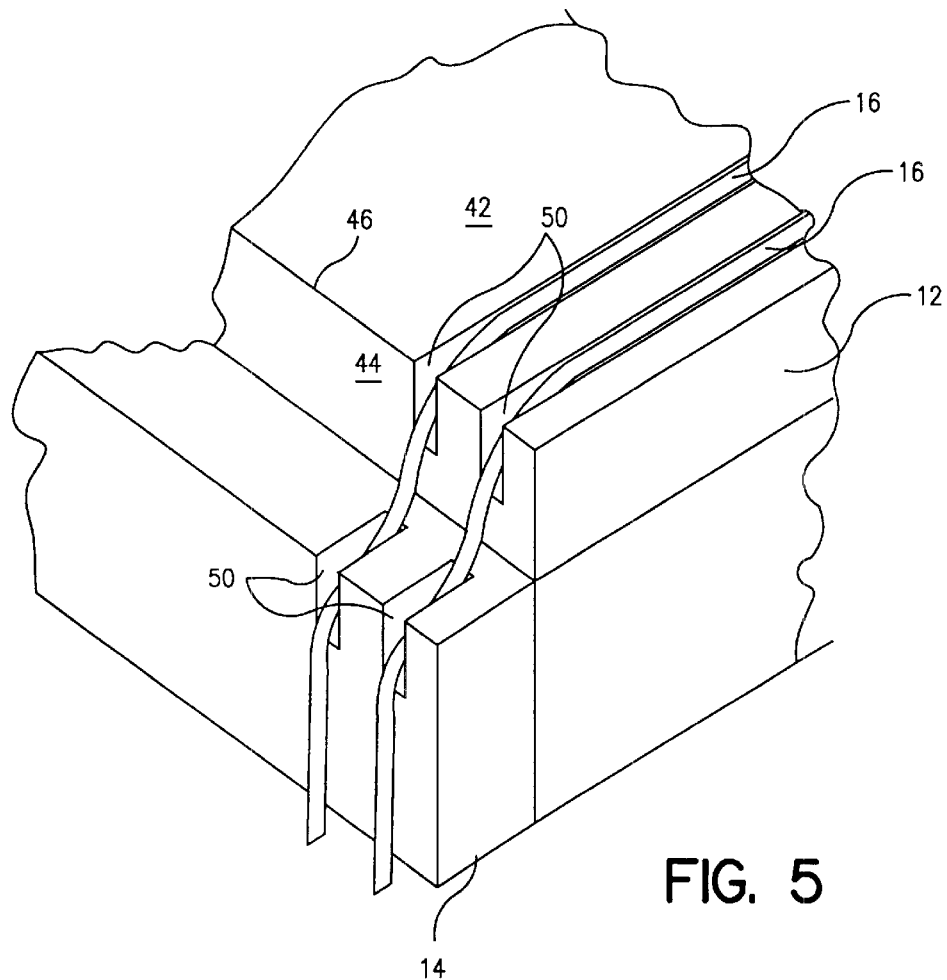
FIGS. 5 and 6 show greater detail of a portion of the manifold assembly.
Figure 6:
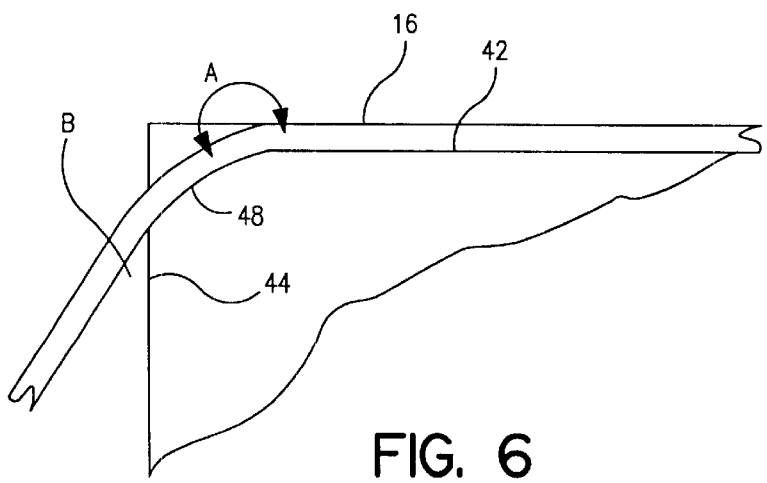

Turning now to FIGS. 5 and 6, another aspect of the present invention is illustrated.

In accordance with this aspect of the invention, manifold structures 12, 14 are advantageously provided with a stress-relieving or distributing feature which reduces the wear and focused stress to which portions of cable 16 are subjected at corners of the fuel cell stack assembly.

As shown, the various components to be held together typically have planar surfaces 42, 44 which define an outwardly facing corner 46 about which cable 16 must traverse.

In accordance with this aspect of the present invention, and as best shown in FIG. 6, such fuel cell components are advantageously provided with an angled wall portion 48 which is angled and positioned between walls 42, 44 such that an external angle A defined between angled wall portion 48 and wall portions 42, 44 is less than 270°. This advantageously serves to reduce the stress applied to cable 16 which would otherwise be applied by a square corner. Preferably, the angle A is between about 205 and about 255°, most preferably about 225°.

Additionally, the slot depth can be varied for different manifolds in order to adjust for different manifold heights so that the cable loading angle B (FIG. 6) is between about 25 and about 75° more preferably between about 40 and about 55°. In this manner the seal loads on each manifold can be controlled within an acceptable range as desired. Further referring to FIG. 5 as well, it is clear that a particular cable segment will have cable loading angles with each adjacent manifold 12, 14 and it is preferred that these angles be maintained substantially the same as to provide a stable structure.

Still referring to FIGS. 5 and 6, it is another advantageous aspect of the present invention to define angled wall portion 48 inset into the component as best shown in FIG. 5, so as to define a slot 50 into which cables 16 can be positioned so as to laterally secure same and lend further stability to the final fuel cell stack structure.

If desired, slots 50 can be continued as grooves along the remainder of the outer wall of the fuel stack assembly, as well, so as to further enhance stability of the resulting structure.

It should be readily appreciated that the manifold attachment structure of the fuel cell stack assembly of the present invention advantageously serves to provide a final assembly having drastically reduced volume, making the structure more suitable for use in transportation and other space-sensitive applications, while further providing advantageous pressure-relief characteristics in a structure that is nevertheless mechanically sound and reliable in use.

In order to further evaluate the advantages of the structure of the present invention, a 75 kW cell stack was prepared and secured with external manifolds using cables as described in accordance with the present invention. Tests were conducted in order to evaluate the performance of the structure during unintended ignition and combustion events. Specifically, the tests were conducted to provide an evaluation of structural integrity of the stack should ignition occur during normal operation while hydrogen and air are in the fuel stack system (i.e., during normal startup), and to provide a determination of the structural integrity of the stack should ignition occur in a "worst case" scenario wherein a well-mixed stoichiometric mixture of fuel and air was present throughout the fuel stack system. After being subjected to a series of such events, with pressures as high as approximately 70 psi, some pressure was relieved through the inlet manifold seal and no structural damage to the stack was evident. Thus, the fuel cell stack assembly of the present invention can withstand substantial pressure pulses, at least as high as about 70 psi, as desired.

It should be appreciated that the fuel cell stack and manifold attachment system provided in accordance with the present invention has therefore provided a stable, secure and reliable structure which occupies substantially reduced volume and has substantially less weight, thereby providing a structure which is particularly well suited to transportation applications and other applications where space is an issue.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A fuel cell stack assembly, comprising:
    a fuel cell component and at least one manifold positioned adjacent to said fuel cell component; and
    a cable disposed around said fuel cell stack assembly for securing said manifold to said fuel cell component, said cable having an adjustable securing member for adjusting tightness of said cable around said fuel cell assembly, wherein said cable has two ends, and wherein said adjustable securing member comprises a threaded member fixed to one of said two ends and a threaded sleeve rotatably mounted to the other of said two ends for threaded engagement with said threaded member.

2. The fuel cell stack assembly of claim 1, wherein said cable has a minimum breaking strength of at least about 450 lbs.

3. The fuel cell stack assembly of claim 1, wherein said fuel cell stack assembly has a maximum expected load which can be exerted on said cable, and wherein said cable has a minimum breaking strength of about twice said maximum expected load.

4. The fuel cell stack assembly of claim 1, wherein said cable comprises a plurality of cable sections each having two ends, each cable section having a threaded member fixed to one of said two ends and a threaded sleeve rotatably mounted to the other of said two ends for threaded engagement with said threaded member of an adjacent cable section of said plurality of said cable sections.

5. The fuel cell stack assembly of claim 1, wherein said at least one manifold comprises at least one air manifold and at least one fuel manifold.

6. The fuel cell stack assembly of claim 1, wherein said fuel cell assembly defines outwardly facing flat surfaces defining corner portions, wherein said corner portions are traversed by said cable, and wherein said corner portions comprise an angled surface positioned between said flat surfaces defining said corner portions, said angled surface being positioned at an external angle with said surfaces which is less than 270°.

7. The fuel cell stack assembly of claim 6, wherein said external angle is between about 205° and about 255°.

8. The fuel cell stack of claim 6, wherein said angled surface is set into said manifold assembly so as to define a slot for holding said cable in position relative to said angled surface.

9. The fuel cell stack assembly of claim 1, wherein said fuel cell stack assembly is capable of handling a pressure pulse of at least about 70 psi.

10. A fuel cell stack assembly, comprising:

a fuel cell component and at least one manifold positioned adjacent to said fuel cell component; and a cable disposed around said fuel cell stack assembly for securing said manifold to said fuel cell component, said cable having an adjustable securing member for adjusting tightness of said cable around said fuel cell assembly, wherein said cable has a minimum breaking strength of at least about 450 lbs.

11. A fuel cell stack assembly, comprising:

a fuel cell component and at least one manifold positioned adjacent to said fuel cell component; and a cable disposed around said fuel cell stack assembly for securing said manifold to said fuel cell component, said cable having an adjustable securing member for adjusting tightness of said cable around said fuel cell assembly, wherein said fuel cell stack assembly has a maximum expected load which can be exerted on said cable, and wherein said cable has a minimum breaking strength of about twice said maximum expected load.

12. A fuel cell stack assembly, comprising:

a fuel cell component and at least one manifold positioned adjacent to said fuel cell component; and a cable disposed around said fuel cell stack assembly for securing said manifold to said fuel cell component, said cable having an adjustable securing member for adjusting tightness of said cable around said fuel cell assembly, wherein said cable comprises a plurality of cable sections each having two ends, each cable section having a threaded member fixed to one of said two ends and a threaded sleeve rotatably mounted to the other of said two ends for threaded engagement with said threaded member of an adjacent cable section of said plurality of said cable sections.

13. A fuel cell stack assembly, comprising:

a fuel cell component and at least one manifold positioned adjacent to said fuel cell component; and a cable disposed around said fuel cell stack assembly for securing said manifold to said fuel cell component, said cable having an adjustable securing member for adjusting tightness of said cable around said fuel cell assembly, wherein said fuel cell assembly defines outwardly facing flat surfaces defining corner portions, wherein said corner portions are traversed by said cable, and wherein said corner portions comprise an angled surface positioned between said flat surfaces defining said corner portions, said angled surface being positioned at an external angle with said surfaces which is less than 270°.

\* \* \* \* \*